United States Patent [19]

Finch

[11] Patent Number: 4,702,746

[45] Date of Patent: Oct. 27, 1987

[54] SYSTEM FOR PRODUCING FUEL PELLETS

[75] Inventor: Maurice Finch, Worcester, England

[73] Assignees: Simon-Barron Limited, Gloucester; Henley Burrowes & Co. Ltd., Worcester, both of England

[21] Appl. No.: 824,579

[22] Filed: Jan. 23, 1986

[30] Foreign Application Priority Data

Jan. 24, 1985 [GB] United Kingdom ............... 8501830
Mar. 20, 1985 [GB] United Kingdom ............... 8507249
Mar. 20, 1985 [GB] United Kingdom ............... 8507250

[51] Int. Cl.$^4$ .............................................. C10L 5/36
[52] U.S. Cl. ............................................ 44/14; 44/6; 44/10 A; 44/12; 44/13
[58] Field of Search .................... 44/6, 10 A, 12, 13, 44/14

[56] References Cited

U.S. PATENT DOCUMENTS

| | | | |
|---|---|---|---|
| 4,120,666 | 10/1978 | Lange | 44/14 |
| 4,389,218 | 6/1983 | Pike | 44/6 |
| 4,561,860 | 12/1985 | Gulley et al. | 44/10 A |
| 4,582,511 | 4/1986 | Siddoway et al. | 44/6 |

Primary Examiner—Curtis R. Davis
Attorney, Agent, or Firm—Nies, Webner, Kurz & Bergert

[57] ABSTRACT

A system for converting selected commercially or industrially derived waste materials in a generally dry and friable form, into a pelleted fuel product, comprising an input conveyor (10), a primary breaker (11) for breaking and reducing the incoming materials, a levelling drum (38), a magnetic drum (43) for extracting ferrous objects from the stream of materials, a shredder (16) from which shredded, cut and screened materials are directed by an air stream into a collecting bin (18) from which they are fed to a densifier (21) which creates a denser stream of materials to be fed to a pelleting press (22) from which the pelleted fuel product is taken via output conveyor (23).

15 Claims, 15 Drawing Figures

SYSTEM FOR PRODUCING FUEL PELLETS

This invention concerns a system for converting selected commercially or industrially derived waste materials in a generally dry and friable form, into a pelleted fuel product.

Many commercial and industrial premises produce a considerable volume of waste materials made up largely of paper, cardboard, fabrics and certain plastics, which must be disposed of, and an object of the present invention is to provide a system which will enable these materials to be converted into a usable fuel of considerable calorific value.

According to the present invention there is provided a system for producing fuel pellets from dry and friable waste materials, comprising a shredder for cutting, shredding and screening incoming materials; means for inducing a conveying air stream for said materials; a collection container connected to said shredder to receive materials therefrom entrained in said air stream, and including air removal means; a densifier connected to the collection container, to receive material therefrom to increase the density of a stream of the material; and a pelleting press having an inlet connected to the densifier, an annular die and one or more press rollers co-operating with the die, means for directing the material entering the press, into the nip between the annular die and the or each press roller, and means for cutting the material extruded from the die into pellets.

Preferably, the system also comprises means for preparing dry and friable waste materials for the production of fuel pellets therefrom, comprising a primary breaker for breaking and reducing incoming materials; a conveyor for transporting a stream of said broken and reduced materials; a levelling drum in contact with the stream of materials to control the depth of said stream; and means carrying said stream onwards from said levelling drum; to said shredder.

Also, according to the present invention, there is provided a process for producing fuel pellets from dry and friable waste materials, comprising the steps of cutting, shredding and screening incoming materials; conveying the screened materials entrained in an air stream, to a collection container in which they are temporarily stored; feeding the materials from said container into a densifier to increase the density of said stream of materials; and passing the densified materials to a pelleting press in which they are extruded through a die and cut into pellets.

Preferably, said process also comprises the steps of preparing dry and friable waste materials for the production of fuel pellets therefrom by breaking and reducing incoming materials; transporting said broken and reduced materials to a levelling drum which controls the depth of a stream of transported materials; and conveying the materials onwards for cutting, shredding and screening same.

During the process aforesaid, the material can be conditioned using liquor sprays in order to enhance its appearance, calorific value, case of handling and storage, or any other characteristic rendering the product more suitable for further use.

An embodiment of the invention will now be described, by way of example only, with reference to the accompanying drawings, in which.

Figure 1:
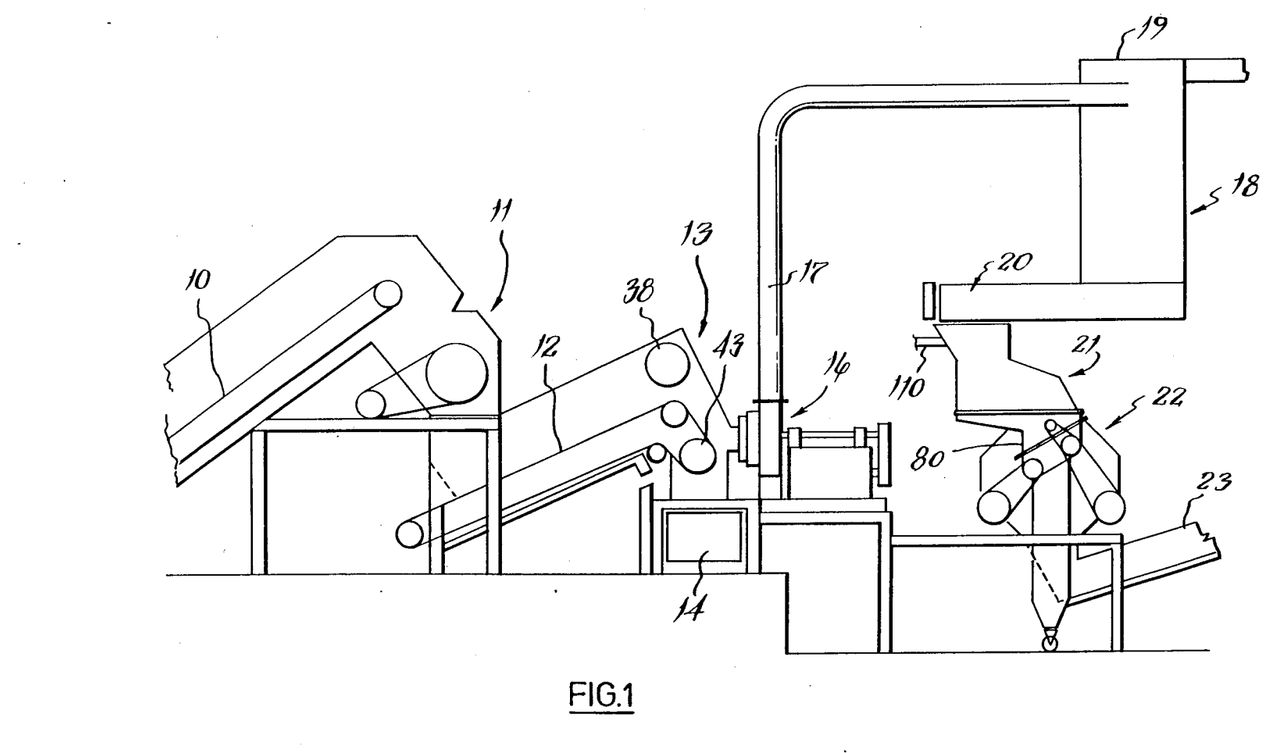
FIG. 1 is a schematic elevation showing the component parts of a system for producing fuel pellets, and their inter-relationship.

Referring now to FIG. 1, the system comprises an input conveyor 10 for supplying raw materials to be processed to a primary breaker generally indicated at 11 which breaks and reduces the material and from which it is deposited onto a further conveyor 12 which carries the material through a levelling station generally indicated at 13. Heavy and ferrous objects are extracted and deposited onto a collection conveyor 14, and the remainder of the material is directed onwardly through an outlet 15 into a shredder 16.

Material leaves the shredder 16 after cutting, shredding and screening, via a duct 17 and is passed into a cyclonic surge bin 18 from which air is removed via duct 19. The material settling in bin 18 is transported via conveyor 20 into a densifier 21 and then into a pelleting press 22 wherein it is converted into pellets which are disposed of by an output conveyor 23.

The material to be processed in the system mostly comprises paper or paper products such as cardboard and other light friable and combustible materials. These will be referred to herein generally as "material".

Figure 2:
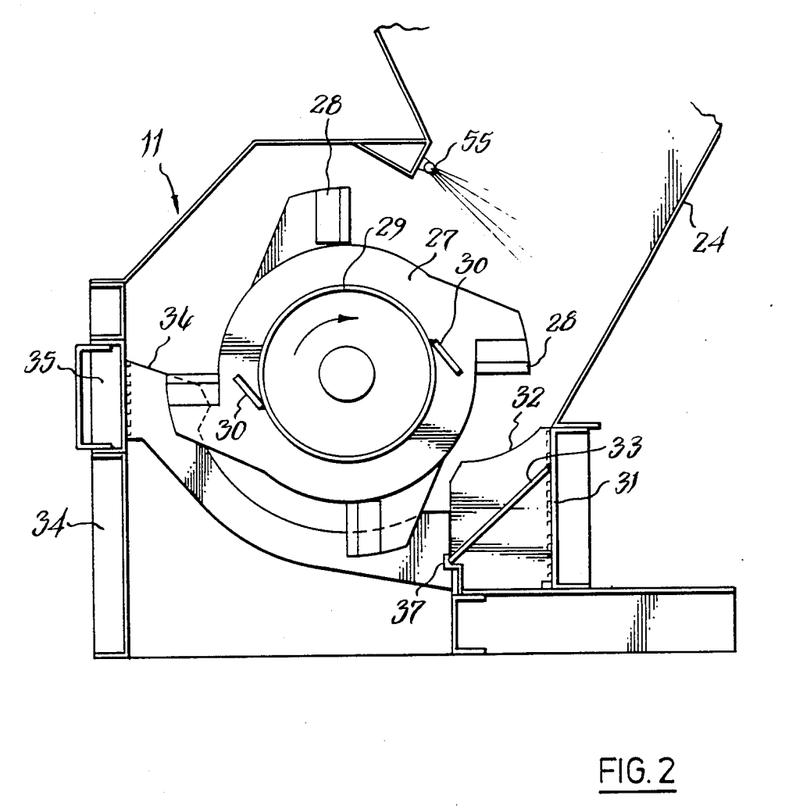
FIG. 2 is a more detailed view of a primary breaker.

Referring now to FIG. 2, the primary breaker 11 to which material is delivered by conveyor 10 via a chute 24 includes a shaft 25 driven by a motor 26 and carrying a plurality of axially-spaced blade carriers 27 each having four equidistant hardened steel breaker blades 28 circumferentially spaced around its periphery.

Figure 3:
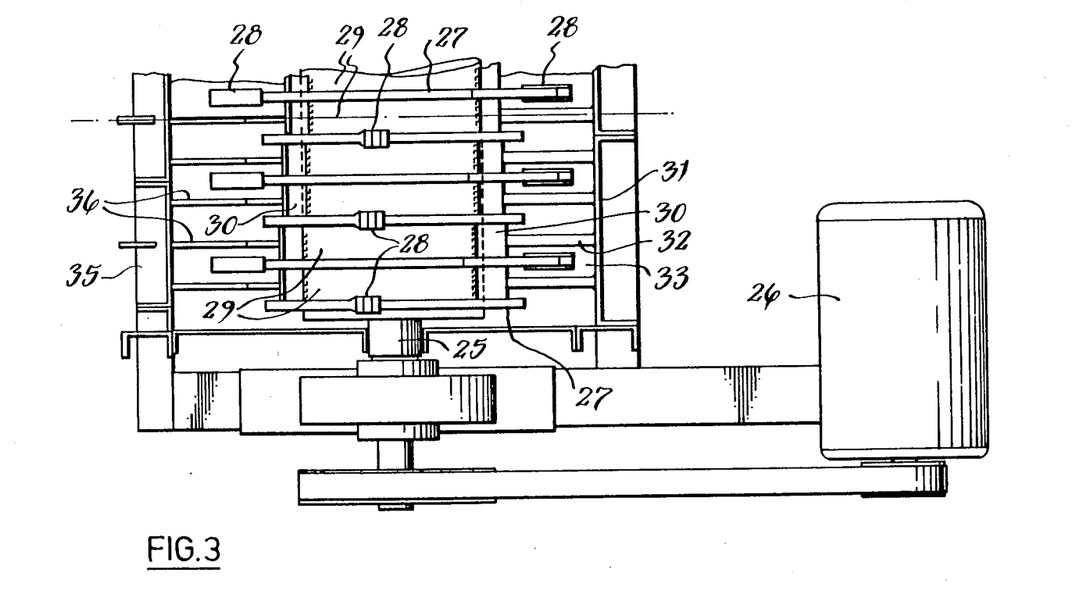
FIG. 3 is an overhead view of the primary breaker with casing members removed for ease of illustration.

As can be seen from FIG. 3, the carriers 27 are positioned on shaft 25 such that the blades 28 of each carrier 27 are displaced with respect to those of the next adjacent carrier by an angle of approximately 10 degrees for a purpose which will be described later in relation to the operation of the machine. An annular member 29 extends between each adjacent pair of carriers 27 and has welded thereto a pair of diammetrically opposite generally tangentially extending secondary blades 30.

Welded or otherwise fixedly attached to an upstanding frame member 31 are a series of spaced primary blades 32, and between each consecutive pair of blades 32 there is fixed an inclined plate 33.

Welded or otherwise fixedly attached to a second upstanding frame member 34 by way of a number of removable frame members 35, are a plurality of spaced secondary blades 36. As can be seen from FIGS. 2 and 3, blades 32 and 36 form together a break grid, and the blades 28 on shaft 25 rotate between the grid bars thus to break and reduce the material passing through the primary breaker 11. The secondary blades 36 are removably located with respect to blades 32, at 37. Careful inspection of FIG. 3 will show how blade carriers 27 are so disposed on shaft 25 that the blades 28 are offset axially with respect to the centre lines of the spaces between the grid bars with the result that as a blade passes between an adjacent pair of blades 32 it passes slightly closer to one than the other. This applies also to its passage between adjacent secondary blades 36.

Therefore as material is deposited from conveyor 10 into chute 24 it is broken and reduced by the interaction of blades 28, 32 and 36. The angular displacement of blade carriers 27 with respect to each other tends to impart to blades 28 a degree of "scissor action" to assist in breaking the materials to distribute the load applied at the anvil point. Tangenial blades 30 serve to deflect the material radially, and the breaking action is enhanced by the axial displacement of blades 28 with respect to blades 32 and 36.

Figure 4:
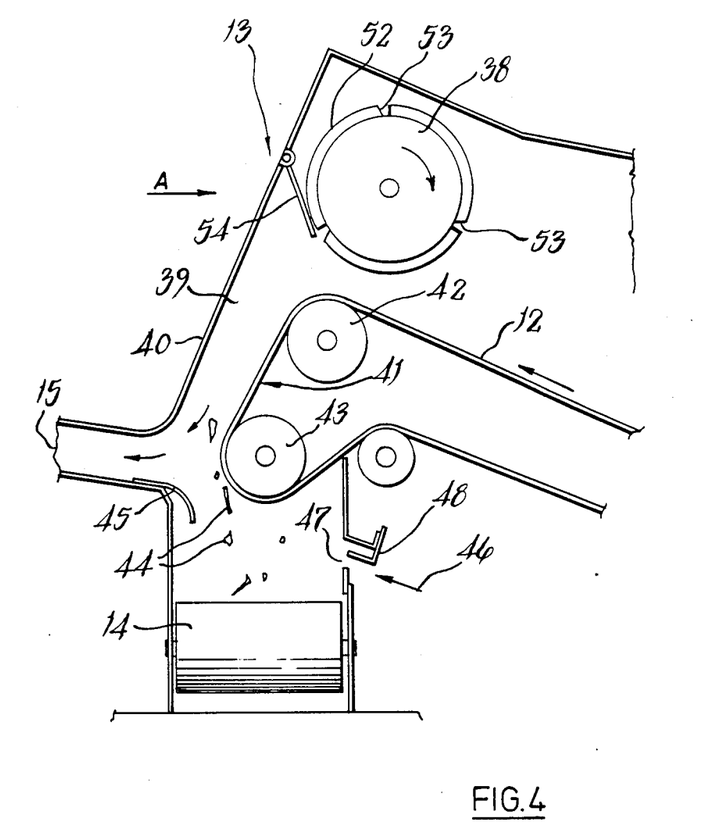
FIG. 4 is a more detailed view of a levelling drum and means for magnetically attracting and removing a ferrous fraction from a stream of material.

The broken and reduced material is deposited onto conveyor 12 and transported onwards into levelling section 13. Referring now to FIG. 4, as material reaches the top of conveyor 12 it passes beneath a levelling drum 38 which thus controls the depth of the stream of material passing therefrom into a chute 39 which is to be comprised by the adjacent section of casing wall 40 and a downwardly inclined section 41 of conveyor 12 between rollers 42 and 43. Roller 43 is constituted by, or includes, a permanent or electric magnet (not shown) whereby ferrous objects within the stream of material are attracted to and held against the surface of belt 12 during its passage around roller 43. Such objects are indicated at 44. As the belt leaves the magnetic roller the objects 44 are permitted to fall onto conveyor 14 for disposal or recovery.

During passage of the material downwardly through chute 39 heavy, non-ferrous objects are permitted also to fall onto conveyor 14, and the extent to which such objects are free to fall out of the stream is controlled by an adjustable baffle plate 45. The remainder of the material is directed towards outlet 15, and this is preferably assisted by suction applied at the outlet, as will be described, which serves to draw air inwardly as indicated by arrow 46 through a gap 47 which is adjustable by means of a baffle plate 48.

Figure 5:
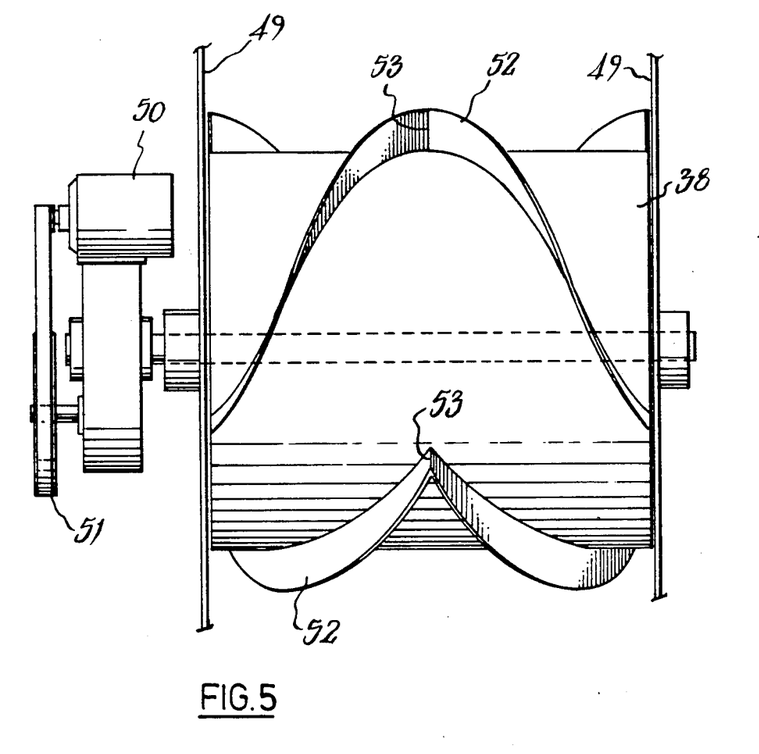
FIG. 5 is a an enlarged and more detailed view taken generally in the direction of arrow A in FIG. 4, again with casing members removed for ease of illustration.

Referring now to FIG. 5, in which details of levelling drum 38 are illustrated, it will be seen that the drum rotates between a pair of side members 49 which define the width of the levelling station and of conveyor 12. The drum is driven by motor 50 and associated drive reduction system 51, and carries on its periphery a surface formation comprised by three angularly spaced upstanding "chevron" blades 52 having their apices 53 leading in the direction of rotation. Blades 52 serve to level the material as it passes beneath drum 38 so that the depth of the stream is controlled. As can be seen from FIG. 4, a hinged flap 54 is biased upwardly to rest against the outer surface of blades 52 thus tending to prevent the passage of air into chute 39 from the upper region of the casing.

Output 15 is connected directly to the shredder 16 adapted to cut, shred and screen the incoming material into a smaller fraction, and the shredder is conveniently fitted with a fan, as will be described, thus to create the air stream entering at 47 and serving to transport the material throughout outlet 15, through the shredder and onwards into the further process apparatus.

If required, a liquor spray 54 may be provided in the primary breaker 11 and/or elsewhere in the system to apply a conditioning liquor to the material. Since it is intended that the material shall remain substantially dry at this stage of the process the spray will preferably be in the form of a mist of fine particles whose principal function is to reduce the spread of dust within the system. The liquor spray may contain chemical additives, for example in the form of neutralising agents to control or prevent the emission of certain noxious substances from combustion of the final product. Such an additive might be lime to neutralise the hydrochloric acid produced when burning certain waste derived fuels.

The additives can be in a dry or semi-dry state, and they can be applied at any position for optimum absorption or effect. In operation, it is intended that the shaft 25 carrying blades 28 shall rotate at approximately 500 r.p.m., and it is expected that the system will handle material at a rate of approximately three to four tonnes per hour or more.

The apparatus so far described is adapted to prepare dry and friable waste materials for the production of fuel pellets therefrom. There will now be described a system for producing the fuel pellets from said material.

Figure 6:
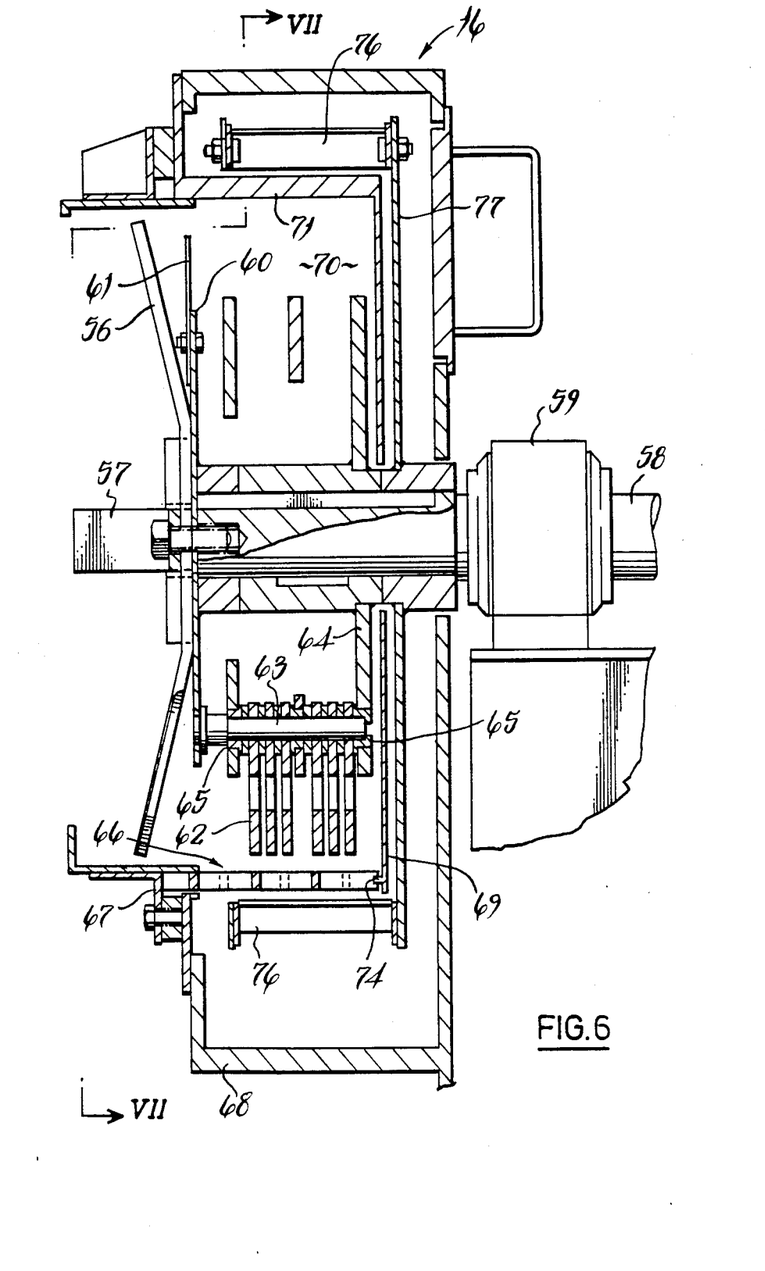
FIG. 6 is a more detailed view of a shredder with means for inducing a conveying air stream for the materials.
Figure 7:
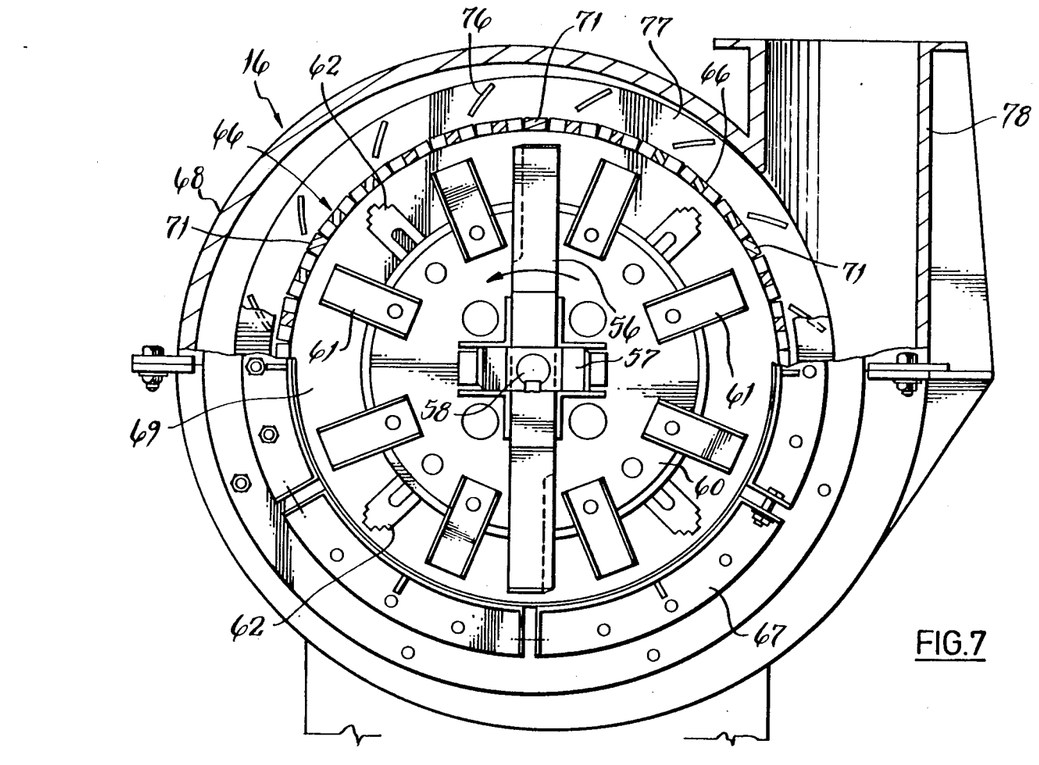
FIG. 7 is a section taken on line VII—VII of FIG. 6.

FIGS. 6 and 7 show the construction of shredder 16 into which the material is delivered from outlet 15 to be initially cut by a pair of elongate blades 56 and 57 disposed at right angles to one another and fixedly attached for rotation to a driveshaft 58 mounted in bearings 59. Also attached for rotation to shaft 58 is a disc 60 carrying a plurality of circumferentially spaced radially directed blades 61 which impose a further cutting action on the incoming material. Behind the disc 60 there are four sets of beater bars 62, each set being mounted for free rotation on a pin 63 which extends between disc 60 and a backing plate 64. Bushes 65 disposed at each end of pin 63 retain the pin with a small amount of free movement therein.

Radially spaced from the free ends of beater bars 62 and fixed circumferentially around the rotational axis of shaft 58 are a plurality of screen bars 66 each extending in a direction parallel to the axis of shaft 58 and retained between a front member 67 of a general housing 68, and an annular shroud member 69 which effectively forms a back wall to a chamber 70 in which blades 61 and beater bars 62 rotate. The member 69 is retained by a plurality of circumferentially spaced struts 71 so that the screen bars 66 occupy the circumferential extent of the spaces between struts 71, as can be seen in FIG. 7.

Figure 8A:
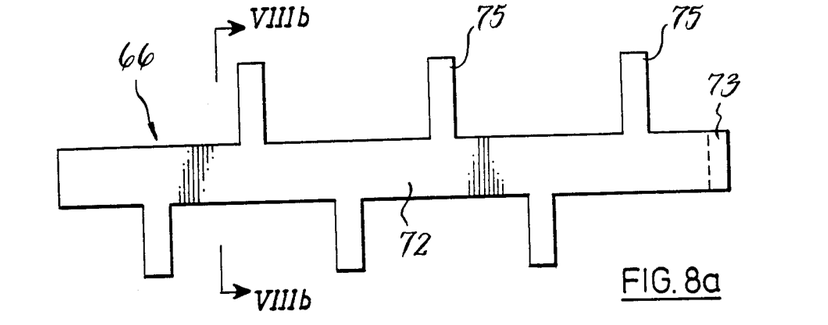
FIGS. 8a and 8b are respectively plan and vertical section on line VIII—VIII of a component part of the shredder as illustrated in FIG. 7.
Figure 8B:
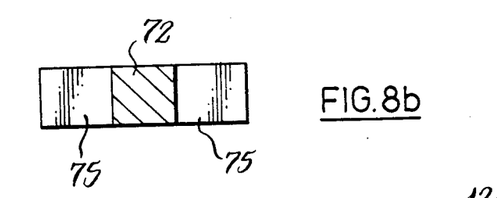

Each screen bar can be seen from FIG. 8a to comprise a central elongate member 72 slotted at one end as illustrated at 73 to be retained by lugs 74 (see FIG. 6) on member 69 and having three longitudinal spaced transversely extending limbs 75 on each side of the central member 72, the libs 75 on one side of the member being offset from those on the other as can be readily seen in FIG. 8a. The screen bars 66 which may be of a different configuration, together form a composite screen in order to determine the size and form of the material projected therethrough by the parts rotating within chamber 70. Also, the bars 66 are afforded a small amount of free movement which helps to prevent the edges thereof from becoming rapidly worn by the continuous impact of the material passing through the screen.

Radially disposed just outside the screen bars 66 are a plurality fan blades 76 circumferentially spaced around a supporting disc 77 which is rigidly attached to shaft 58. As can be seen in FIG. 7, the housing 68 has a tengential outlet port 78 which communicates with duct 17. Thus, material cut, shredded and screened within shredder 16 is directed by a stream of air created by fan blades 76, along duct 17 towards the cyclonic surge bin 18.

Figure 9:
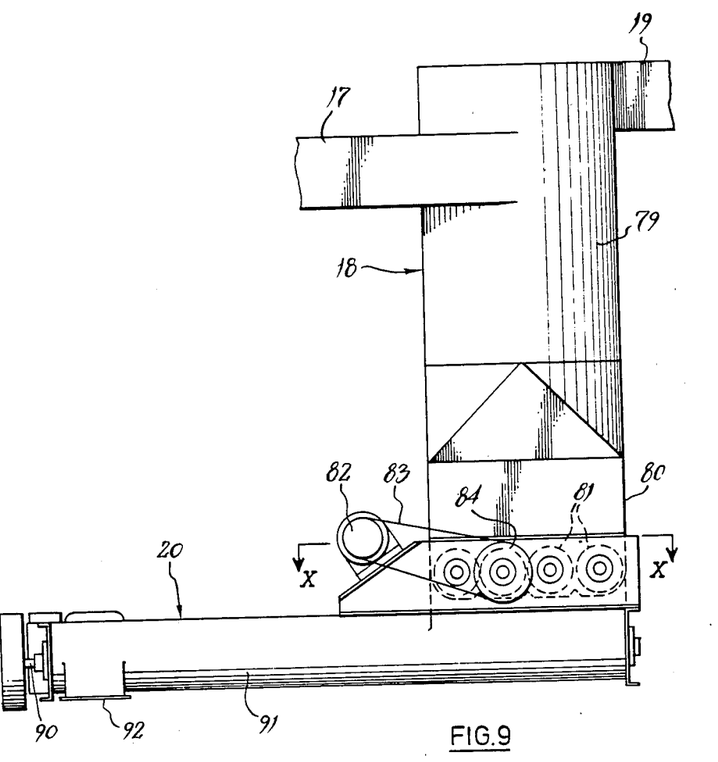
FIG. 9 is a more detailed view of a cyclonic surge bin.

The material enters the bin 18 via duct 17 and settles in the base region thereof whilst a considerable amount of the conveying air is removed via reverse involute duct 19 to be cleaned by filtration and released to atmosphere. An upper limit sensor (not shown) to prevent bin 18 from overfilling whereupon material could become entrained in the air stream in duct 19, is provided to control the flow of material in duct 17. The bin 18 has an upper portion 79 of circular cross-section which diverges to a square section base portion 80. This configuration assists in the gentle settling of the material in the base of the bin. At the bottom of base portion 80 there is a set of four conveying screws 81 driven from a variable speed motor 82 via belt 83, pulley 84 and meshing gears 85 (see FIG. 10) such that adjacent screws rotate in opposite directions but their flights 86 are oppositely disposed, one to the next, so that the material is conveyed by each screw 81 in a direction illustrated by arrows 87 towards one side of the bottom of the bin. The speed of motor 82 can be varied to control the rate of flow of material fed to the press 22, thus to optimise press performance. For this purpose the load on the press can be monitored, and a resultant signal used to control the speed of motor 82.

Figure 10:
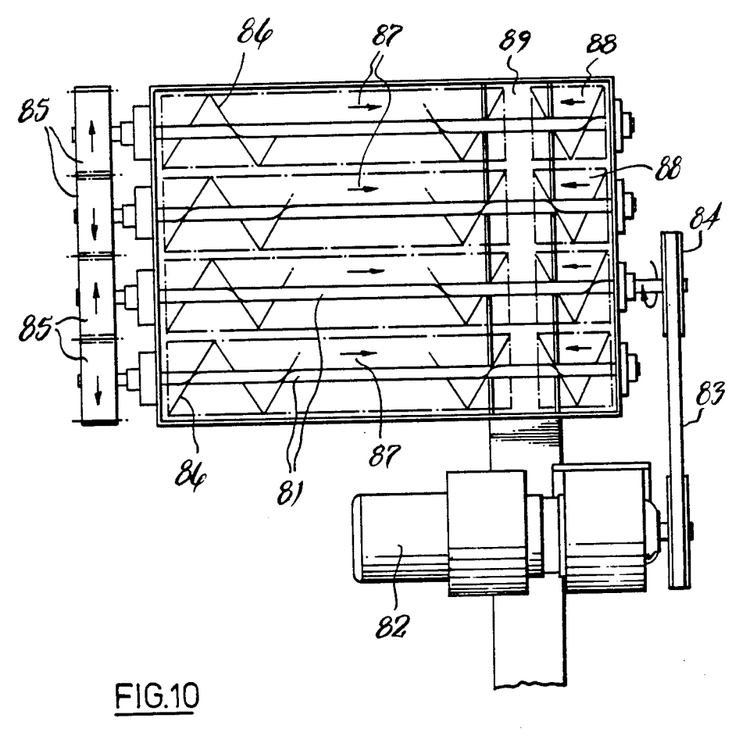
FIG. 10 is a horizontal section taken on line X—X of FIG. 9.

As can be seen from FIG. 10 each screw 81 terminates at the right-hand end in a short screw section 88 with reverse pitch to reverse the flow of material towards the main screw section thus accumulating material in a zone designated by reference numeral 89, the base of which is open to permit the material to pass into conveyor 20.

Thus in zone 89 the material is kept "live" i.e. it is continuously moving to prevent it from bridging the outlet to conveyor 20, as a solid mass. If required, a deflector plate or other means (not shown) may be provided to ensure an even distribution of material across screws 81, and thus a constant and even deposit of material into conveyor 20. Since the material being handled is generally rather dry, the clearance around each conveying screw 81 is selected to be at least 15 mm across thus to prevent the dry material from forming a composite sleeve around the flights 86 which would cause binding of the screws.

Screw flights 86 may be terminated over zone 89 in short "paddle" extensions which extend radially on the ends of screws 87 to assist the transfer of material into conveyor 20.

The conveyor 20 is constituted by a helical screw flight (not shown) mounted on a driven shaft 90, in a casing 91 having an outlet 92. The transition between casing 91 and the base of bin 18 may be gradual, also for the purpose of providing a smooth transfer of material into conveyor 20. For further ease of transfer of difficult materials into conveyor 20, particularly at low speeds, there may be provided, above zone 89, an expansion chamber (not shown) with liquor sprays.

Figure 11:
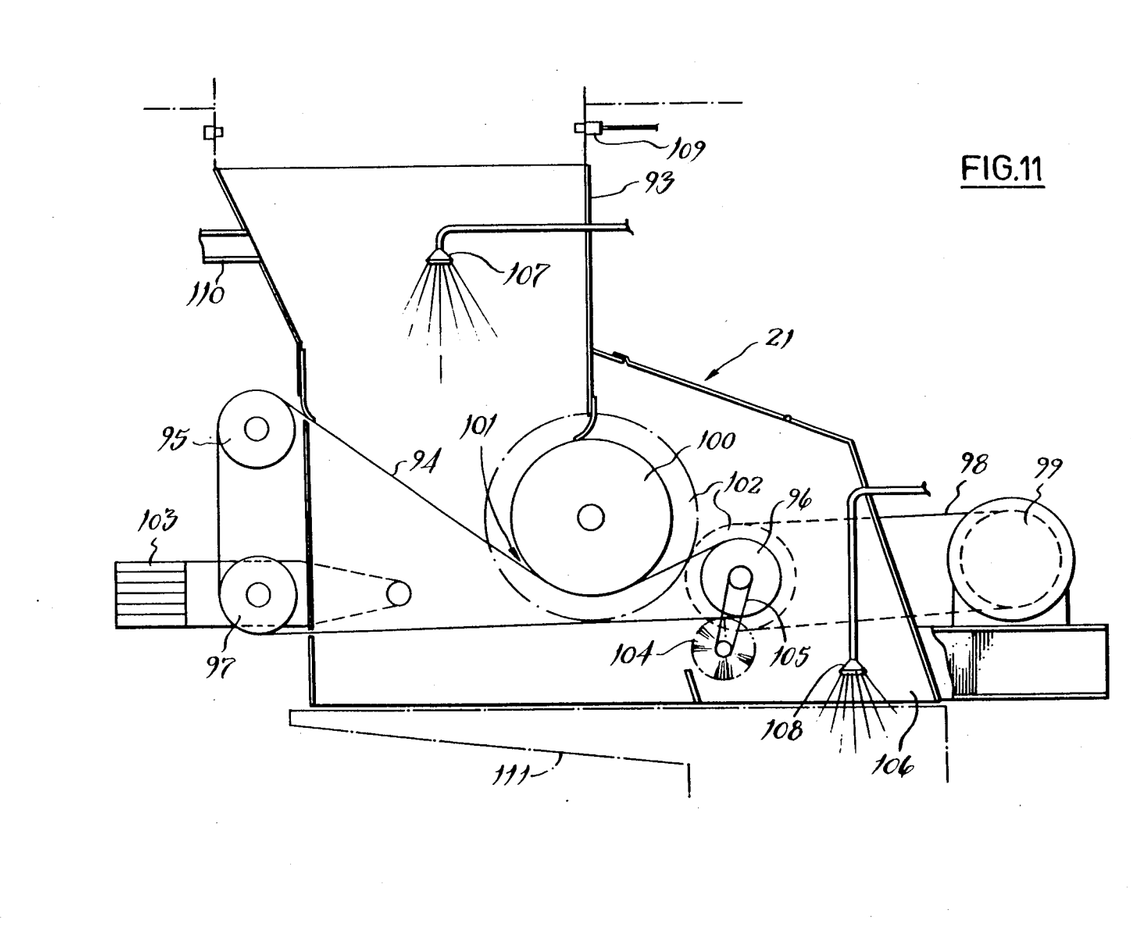
FIG. 11 is a more detailed view of a densifier.

Referring now to FIG. 11, a stream of material issuing from conveyor 20 passes into densifier 21 via an inlet chute 93. Within the densifier, and endless conveyor belt 94 passes around pulleys 95, 96 and 97, and is driven by a pulley 96 and drive belt 98 by a motor 99.

A roller 100 forms a nip at 101 with belt 94 and is also driven in rotation through gears 102 by motor 99. The belt 94 is held in tension by pulley 97 which is pivotally mounted on a weighted arm 103. A rotary brush 104 driven from pulley 96 via a drive belt 105 serves to clean the outer surface of belt 94.

Material entering the densifier 21 via inlet chute 93 falls onto the surface of belt 94 and passes through the nip 101 to be compressed into a densified mat which then leaves the densifier via an outlet 106. In this process, the material is densified from about 5% solids by volume to about 20% solids by volume, and this work is effected with very low power consumption (in the region of 2 kW). Further, a substantially constant density is ensured by the belt 94 being held in tension. The speeds at which the belt 94 and roller 100 are driven can be varied in order to select a predetermined depth of material leaving the densifier. For preference, this will be in the region of 20 mm. Disposed within inlet chute 93 is a spray nozzle 107 adapted to deliver a regulated fine spray of water or other additive onto the material before the nip 101. Since the nozzle 107 is disposed centrally within the inlet chute the spray is imparted within the body of material falling onto the belt, thus, to some extent, preventing the material from sticking thereto in the outer regions of the stream which remain relatively dry. A second nozzle 108 optionally may be provided in the outlet 106, and the materials supplied by nozzle 107 and 108 may include such additives as those which help to bind the material together in its final pelleted form, to lubricate the material for case of pelleting, to increase the calorific value of the final pellets or to impart thereto a colour, perfume or surface texture. The nature of the additive materials will determine whether they are added before densification via nozzle 107, or afterwards via nozzle 108.

A modulated light source detector 109 or the like is mounted adjacent the inlet to chute 93 to detect the presence or absence of a stream of material entering the latter. A signal derived from detector 109 is utilised to control the flow of material to nozzle 107 and/or nozzle 108. A duct 110 connects the interior of densifier 21 with the outlet 15 leading to shredder 16. Since the latter is under suction from fan 76 air is continuously drawn from the interior of densifier 21.

Figure 12:
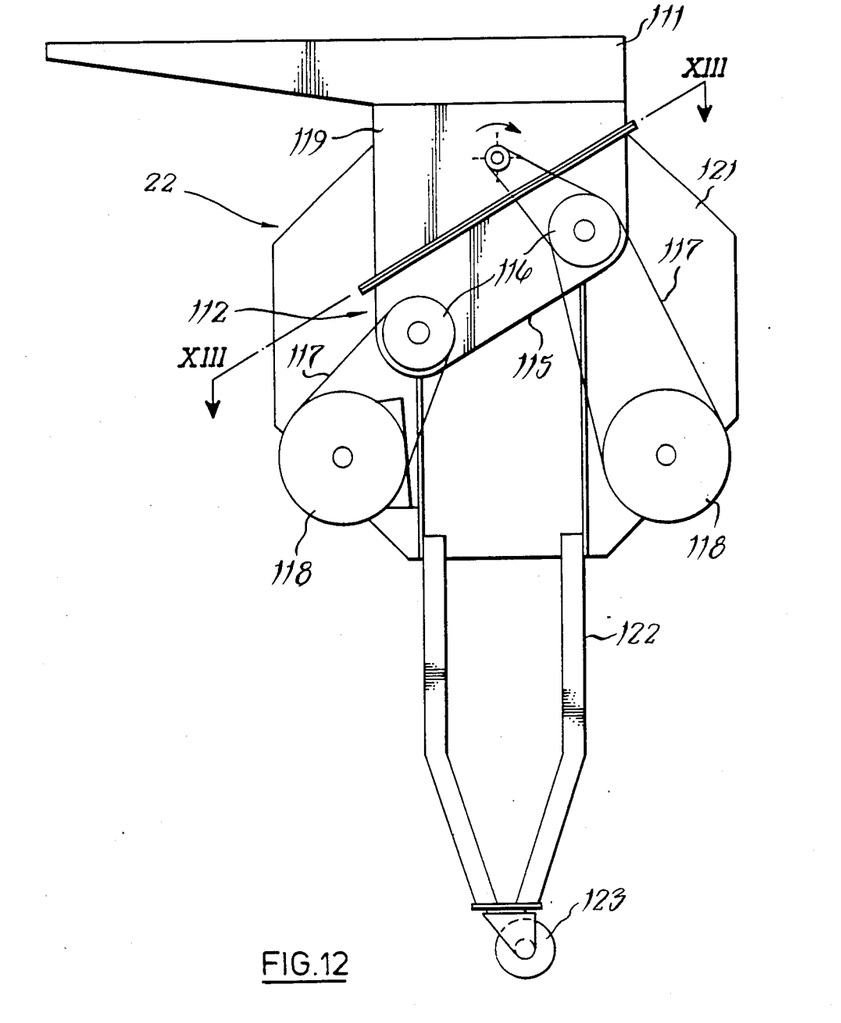
FIG. 12 is a more detailed view of a pelleting press.
Figure 13:
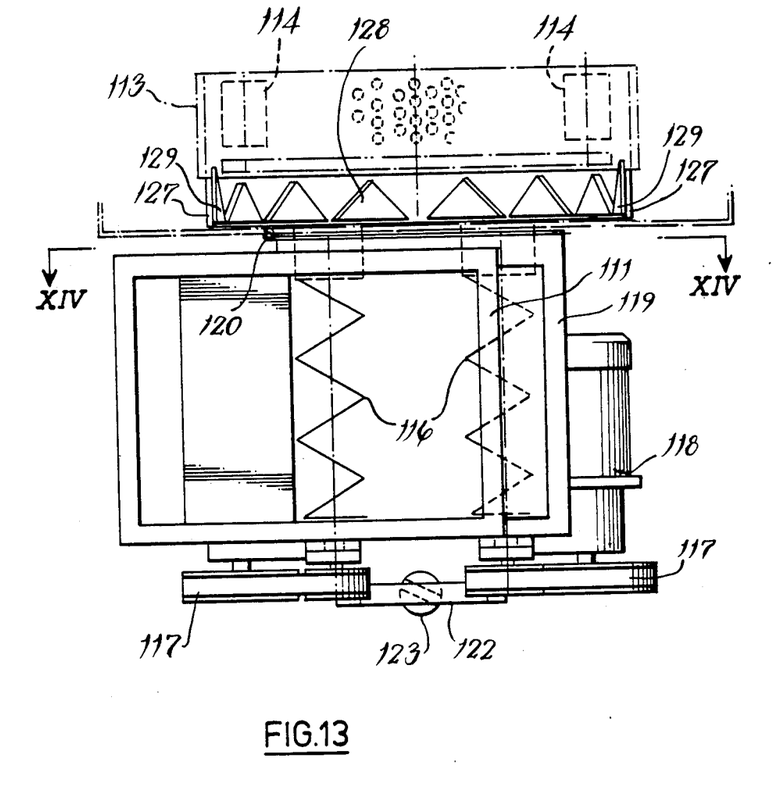
FIG. 13 is a horizontal section taken on line XIII of FIG. 12.
Figure 14:
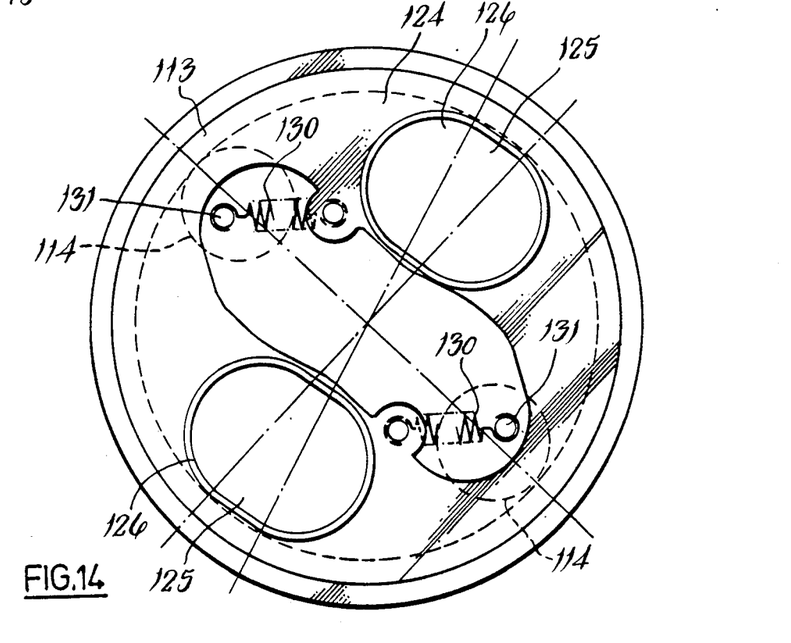
FIG. 14 is a view taken on line XIV—XIV of FIG. 13.

Referring now to FIGS. 12 to 14, the pelleting press 22 includes an inlet chute 111 which communicates with outlet 106 of densifier 21, and a twin screw feeder generally indicated at 112 which, as will be described, delivers material to the nip between an annular die 113 and each of a pair of press rollers 114.

Feeder 112 comprises a trough 115 into which the material is deposited and in which rotates a pair of conveying screws 116 driven via belts 117 by a pair of individual electric motors 118. The trough 115 forms the base of a housing 119 which is hingedly mounted at 120 (see FIG. 13) with respect to press housing 121 and is thus capable of being swung away from the latter, being supported by a leg 122 and castor 123.

Mounted on the front face of housing 121 is a plate 124 of generally circular shape corresponding to the dimension of annular die 113 and containing a pair of arcuate slots 125 providing access into the pelleting chamber within die 113. Surrounding each arcuate slot 125 is a forwardly projecting sleeve 126 which communicates with a pair of outlet apertures corresponding in position with the ends of conveying screws 116. Thus the material in trough 115 is conveyed by screws 116 through said apertures and through the sleeves 126 and slots 125 into the pelleting chamber. As can be seen from FIG. 13, attached to the rotating die 113 on the feed side is a so-called die cone 127 which rotates with the die and forms an annulus through which material being fed into the pelleting chamber must pass. Around the cone there is fixed a circumferential array of triangular teeth 128 which serve to ensure that material is carried forwardly to the nips between die 113 and rollers 114 thus to prevent material accumulating in and around the entry to the pelleting chamber. At two diametrically opposed positions on cone 127 is a pair of enlarged teeth 129 which extend part way into the die 113, again to prevent build-up of material in this region.

In use, if any tramp material enters the nip between one of the press rollers 114 and the die 113, the rollers 114 which are mounted on plate 124 must be sufficiently free to move thus to permit the tramp material to pass without damaging the surfaces of rolls 114 and die 113. To this end, plate 124 is biased in a clockwise direction in FIG. 14 towards an operating position, by means of springs 130 anchored to a pair of fixed members 131. The permitted angular movement of the assembly is approximately 15 degrees as illustrated in FIG. 14, and the elongate configuration of slots 125 ensures continuous alignment of the slots with the outlet apertures in housing 119. Clearly, the sleeves 126 may be attached instead to housing 119, but when the housing is in the operative position as illustrated in FIG. 13, there must be a sealed abutment against sleeves 126 preventing the material from escaping in its passage between the housing 119 and the pelleting chamber. By providing separate motors 118 to drive the two screws 116, it is possible if required, to establish a difference in the conveying rate of the two screws 116 according to the operating conditions within the press. However, a single drive motor for both screws may be preferred.

The pelleting press operates in the conventional manner the material being compacted and extruded through the die 113 and cut into pellets by a knife (not shown) to be dispensed at the base of the press 22, and transported away by conveyor 23.

It is not intended to limit the invention to the above examples only, many variations such as might readily occur to one skilled in the art being possible without departing from the scope of the invention as defined by the appended claims.

For example, the swinging housing 119 can be replaced by an assembly movable, for example, linearly on rails. In this case, a feeder housing having its sleeves 126 in different angular positions which thus provides different feed characteristics, can be selected from a plurality of housings capable of feeding different materials. The positions of press rolls 114 around annular die 113 are adjustable to match the particular feeder to be used. Furthermore, if pre-shredded materials are to be introduced into the system, shredder 16, duct 17, surge bin 18 and conveyor 20 may be replaced by one or more other devices capable of delivering materials in a controlled manner, to the densifier 16.

I claim:

1. A system for producing fuel pellets from dry and friable waste materials comprising:
    a shredder including separate devices rotating on a common shaft for cutting and boating incoming materials to expose a fibrous content thereof, and an assembly of fixed screen bars through which the cut and beaten material is projected to determine its size;
    means for temporarily storing materials received from the shredder;
    means for creating an airstream to convey the materials from the shredder to the storing means;
    a densifier connected to the storing means to receive material therefrom and to compress it into a densified mat;
    a pelleting press connected to the densifier and having an annular die and one or more press rollers co-operating with the die;
    means for directing the material entering the press into the nip between the die and the or each press roller; and
    means for cutting the material extruded from the die into pellets.

2. A system according to claim 1, wherein the conveying means comprises means for inducing a conveying air stream travelling from the shredder to the storage means, the storage means comprises a cyclonic surge bin having air removal means at its top and means in its base to maintain continuous motion of the material thus to prevent compaction thereof, and wherein, in the densifier, the material is caused to pass through a nip between two interacting moving surfaces.

3. A system according to claim 1 or claim 2, including means for preparing the materials for the production of fuel pellets, said means comprising a primary breaker for breaking and reducing incoming materials; a conveyor for transporting a stream of said broken and reduced materials; a levelling drum in contact with the stream of materials to control the depth of said stream; and further means to transport the stream from the levelling drum to the shredder.

4. A system according to claim 3, wherein the primary breaker includes a plurality of blades spaced axially and circumferentially about a rotatable shaft, and a plurality of fixed grid bars between which the materials pass, interposed and cooperating with the blades during rotation of the shaft; wherein the levelling drum is rotatable on an axis which is tranverse to the passage of a stream of materials on the conveyor and having an upstanding surface formation moving in contact with the stream of materials; and wherein there are provided means for magnetically attracting and removing a ferrous fraction from said stream before passage to the shredder.

5. A system according to claim 4, wherein means are provided for collecting ferrous objects removed from said stream of materials and further means are provided to permit heavy, non-ferrous objects to fall from the stream in a controlled manner onto said collection means.

6. A system according to claim 3, wherein said conveying air stream is created by a series of fan blades forming part of the shredder, the latter further comprising a rotated shaft on which are mounted a series of shredding and cutting blades and beater bars together with said fan blades, and a plurality of screen bars extending parallel to the axis of the rotated shaft thus to screen material drawn therethrough by the fan blades.

7. A system according to claim 6, wherein said beater bars and said screen bars are mounted with respect to the rotated shaft with a degree of permitted movement thus to prevent undue wear of said parts.

8. A system according to claim 2, wherein the means in said cyclonic surge bin for maintaining continuous motion of the materials comprises a set of conveying screws in the base of the bin having their axies parallel and side-by-side and driven such that adjacent screws rotate in opposite directions but with their flights oppositely disposed, one to the next, so that the material is conveyed in one direction by all of the screws and wherein each screw is terminated in a short screw section with reverse pitch to reverse the flow of material.

9. A system according to claim 1, wherein said densifier comprises a driven conveying belt and a driven roller which form together a nip through which the material is directed, and a liquor spray so disposed as to apply conditioning liquor substantially centrally within the body of material entering said nip, such that in the outer regions of the stream, the material is relatively dry thus to prevent it from sticking to the belt, a further liquor spray being provided in the outlet from the densifier thus to apply conditioning liquor to the densified material.

10. A system according to claim 1, wherein said pelleting press comprises a twin screw feeder so disposed in relation to the densifier as to receive a stream of material leaving same and to deliver the material to the nip between the annular die and the associated press rollers, said feeder being disposed within a housing which is movable with respect to the annular die to permit working access to the interior thereof, there being, between said twin-screw feeder and the annular die, a pair of sleeves through which the material is fed directly into said nip.

11. A system according to claim 10, including a die cone fixed for rotation with said annular die and including a number of teeth cooperating with the material flowing into the die to prevent same from accummulating at its entry point, the press rollers being mounted on a plate which is permitted a degree of rotational movement about the axis of said die and is spring-loaded towards an operating position such that the rollers may move to permit the free passage of any tramp material entering the nip.

12. A process for producing fuel pellets from dry and friable waste materials, comprising the steps of cutting, shredding and screening incoming materials; conveying and temporarily storing the screened materials; feeding the materials from the container into a densifier and therein increasing the density of said stream of materials; and passing the densified materials to a pelleting press in which they are extruded through a die and cut into pellets.

13. A process according to claim 12, wherein the materials when stored are maintained in continuous motion to prevent compaction thereof.

14. A process according to claim 12, wherein, in said densifier, the material is caused to pass through a nip between two interacting moving surfaces, and wherein prior to entry into said nip, the materials are conditioned using a liquor spray to render the final pelleted product more suitable for further use.

15. A process according to claim 12, including the step of magnetically attracting and removing a terrous fraction of the materials before cutting, shredding and screening same, and of permitting heavy, non-ferrous objects to fall from said stream.

* * * * *

UNITED STATES PATENT AND TRADEMARK OFFICE
CERTIFICATE OF CORRECTION

PATENT NO. : 4,702,746
DATED : October 27, 1987
INVENTOR(S) : Maurice Finch

It is certified that error appears in the above-identified patent and that said Letters Patent is hereby corrected as shown below:

Column 1, line 63, cancel "case" and insert --ease--.

Column 8, line 7, cancel "boating" and insert --beating--.

Column 10, line 33, cancel "terrous" and insert --ferrous--.

Signed and Sealed this

First Day of March, 1988

Attest:

DONALD J. QUIGG

Attesting Officer

Commissioner of Patents and Trademarks